March 27, 1962 D. N. STREETER 3,027,059

TAPE POSITION SENSING DEVICE

Filed May 1, 1959 3 Sheets-Sheet 1

INVENTOR
DONALD N. STREETER
BY
[signature]
ATTORNEY

March 27, 1962 D. N. STREETER 3,027,059

TAPE POSITION SENSING DEVICE

Filed May 1, 1959 3 Sheets-Sheet 2

United States Patent Office 3,027,059
Patented Mar. 27, 1962

3,027,059
TAPE POSITION SENSING DEVICE

Donald N. Streeter, Poughkeepsie, N.Y., assignor to International Business Machines Corporation, New York, N.Y., a corporation of New York Filed May 1, 1959, Ser. No. 810,352
8 Claims. (Cl. 226—45)

This invention relates to a machine for reeling, unreeling and feeding tape. More particularly, the invention relates to means for continuously sensing the position of the tape in a vacuum column.

Machines such as that shown in U.S. Patent 2,792,217 by James A. Weidenhammer have been designed which are capable of feeding record tape at high speed, these systems have the ability to start, stop and reverse the direction of the tape in very short periods of time without imposing excessive stresses on the tape. The general scheme of such machines is to feed the tape from a reel into a first vacuum column, thence to the magnetic transducer, and then into a second vacuum column, and finally to the second reel; movement of tape past the magnetic transducer being controlled by the utilizing device independently from the control of the reel drive motors, the control of the reel drive motors being dependent on the amount of tape in the vacuum column.

The first systems of this type, such as Weidenhammer's, controlled the reel drive motors through a plurality of limit switches in the vacuum columns. If the bottom of the tape loop in the vacuum column went above a top limit position, the reel drive motor was actuated such that tape was fed into the column. If the bottom of the tape loop in the vacuum column went below a bottom limit position, the reel drive motor was actuated in the reverse direction such that tape was taken from the column. When the bottom of tape loop was between the limit positions, the reel was stationary.

Later systems such as that shown in co-pending application, Serial No. 706,184, provide for continuous sensing of the position of the tape in the vacuum column. The signal from the sensing means which is indicative of the position of the tape in the vacuum column is used to control the speed of a variable speed drive motor.

The object of the present invention is to provide an improved means for continuously sensing the position of the tape in the vacuum column.

Other objects of the invention will be pointed out in the following description and claims and illustrated in the accompanying drawings, which disclose, by way of example, the principle of the invention and the best mode which has been contemplated of applying that principle.

Figure 1:
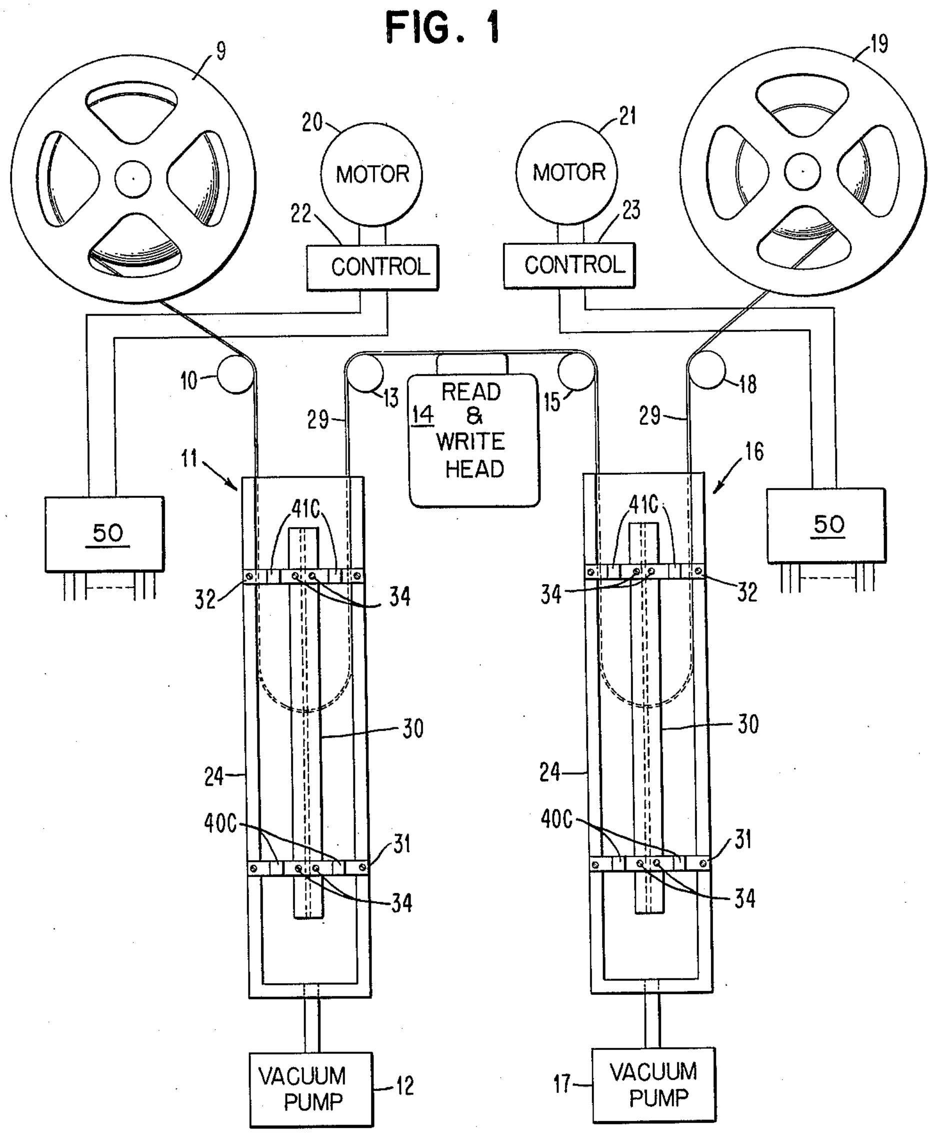
FIG. 1 is a schematic view of a tape feed machine embodying this invention.

A general understanding of this device and its function may be attained by reference to FIG. 1. When the machine is operating in the forward mode the reel 9 which is adapted to hold a coil of magnetic tape feeds the tape past idler 10 into column 11, wherein the pressure differential created by vacuum pump 12 tends to pull the tape into the column. Drive capstan 15 controls the movement of the tape past the magnetic head 14, pulling the tape from column 11, past capstan 13, past the magnetic head 14, and finally feeding the tape into column 16 wherein the pressure differential created by vacuum pump 17 pulls the tape loop into the column; finally the tape is pulled from column 16 by reel 19. When the machine is operating in the reverse mode, the tape goes from reel 19, to column 16, to capstan 15, to head 14, to capstan 13, to column 11, and then to reel 9, movement of tape past the magnetic head 14 and capstan 15 being under the control of capstan 13.

The action of drive capstans 13 and 15 is controlled by the utilizing device (shown in Weidenhammer's U.S. Patent 2,792,217). As the utilizing device actuates capstans 13 and 15, tape is moved past the magnetic head 14, thereby taking tape from one column and feeding tape into the other column.

The tape which is supplied to or taken from the vacuum columns by drive capstans 13 and 15 is supplied and rewound by reels 9 and 19, the drive of which is controlled in accordance with the amount of tape in the vacuum columns.

This invention provides a novel means for sensing the amount of tape in the column and means for producing a signal in accordance therewith, for controlling the reel drive motors 20 and 21, through the motor control means 22 and 23. The motor control means 22 and 23 which form no part of this invention may be of the type described in the co-pending application, Serial No. 706,184.

Figure 2:
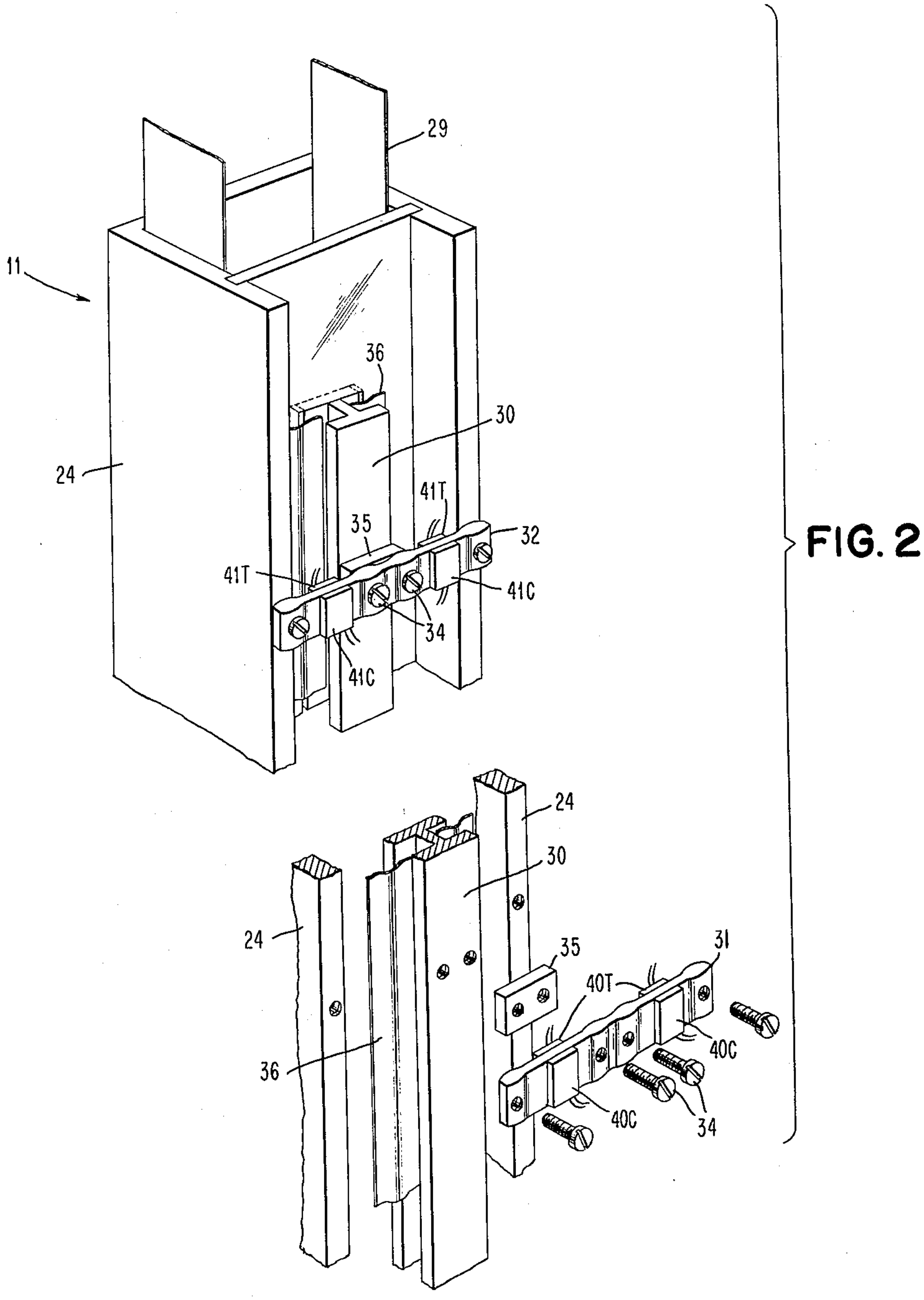
FIG. 2 is a sectional view, partly exploded, of one of the vacuum columns and transducers shown in FIG. 1.

The vacuum column 11 is shown in detail and partly exploded in FIG. 2. Part 24 is a three-sided channel wherein the tape loop 29 may move. The fourth side of the channel includes an inflexible panel 30 which is supported by bars 31 and 32 through screws 34 and spacers 35. Flexible material 36 provides an air-seal between channel 24 and panel 30 yet allows a limited amount of relative motion.

Strain gages 40C are mounted on the outside of arm 31 measuring the compression in said arms and strain gages 40T are mounted on the inside of arm 31 measuring the tension in said arm. Likewise, strain gages 41T and 41C are mounted on arm 32.

As shown, the width of the tape 28 is only slightly less than the internal width of column 11. The tape therefore acts as a valving mechanism for the fluid (the air) and the tape can be said to be in valving proximity with the walls of said column. Hence, as the tape moves in the column the area of panel 30 which is subjected to the vacuum changes, thereby changing the amount of force on the panel in accordance with the following formula:

$$F=(Pa-Pr)wX=KX$$

$F$=force on panel
$Pa$=atmosphere pressure
$Pr$=pressure in vacuum column
$w$=panel width
$K$=constant
$X$=distance of the tape loop from the bottom of the panel The force on panel 30 is transmitted through screws 34 and spacers 35 to arms 31 and 32, causing strain in arms 31 and 32 and hence a change in the resistance of the strain gages 40C, 40T, 41C and 41T. It should be noted that since panel 30 is stiff or inflexible, a directly proportional measurement of the force on panel 30 can be obtained by merely measuring the movement of the panel at the two points where it is supported (i.e. by measuring the strain in arms 31 and 32).

Figures 3, 4:
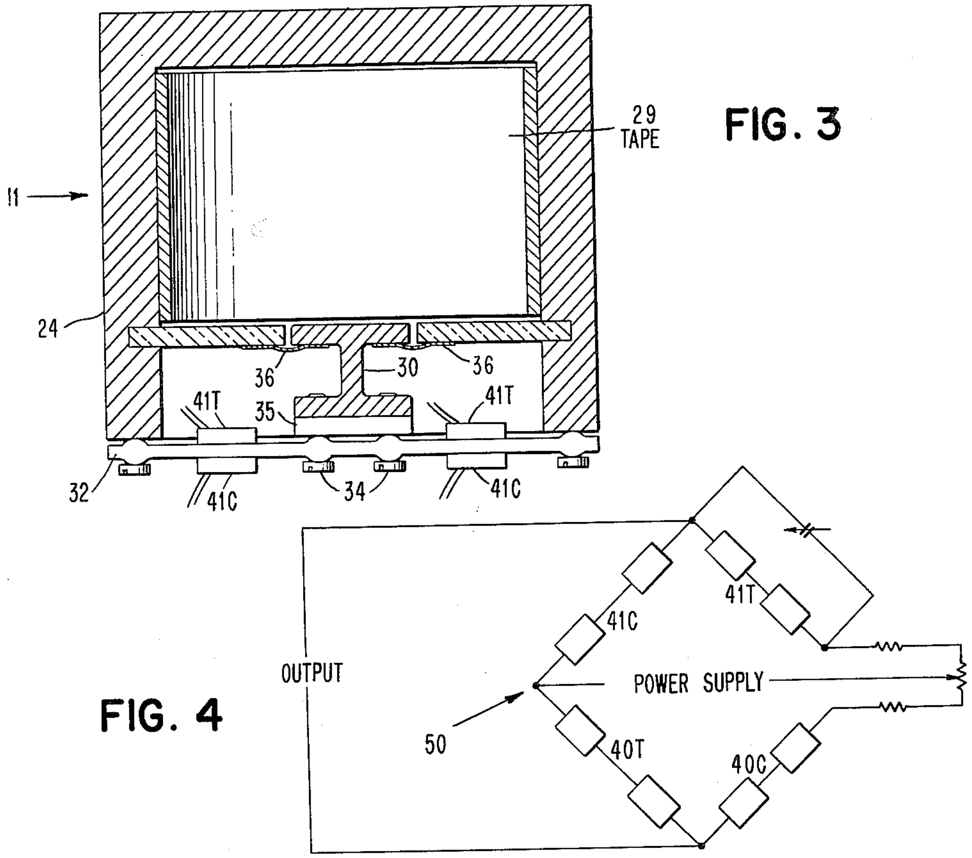
FIG. 3 is a top view of the vacuum column shown in FIG. 2.
FIG. 4 is a diagram of a circuit for summing the outputs from the various strain gages shown in FIG. 1.

The change in resistance of the strain gages is reflected in a summing bridge of the well-known type such as circuit 50 of FIG. 4. The voltage output of circuit 50 is dependent upon the resistance of elements 40C, 40T, 41C and 41T which resistance is in turn dependent upon the strain in arms 31 and 32.

Hence, the output of bridge circuit 50 is essentially proportional to the sum of the strain on beams 31 and 32 and also proportional to the position of the tape loop 29 in the vacuum column since the strain of beams 31 and 32 is proportional to the force on panel 30 which is proportional to the position of the tape loop in the column.

The motor control circuits 22 and 23 receive the output from the bridge circuit 50 and control the reel drive motors accordingly.

Figure 5:
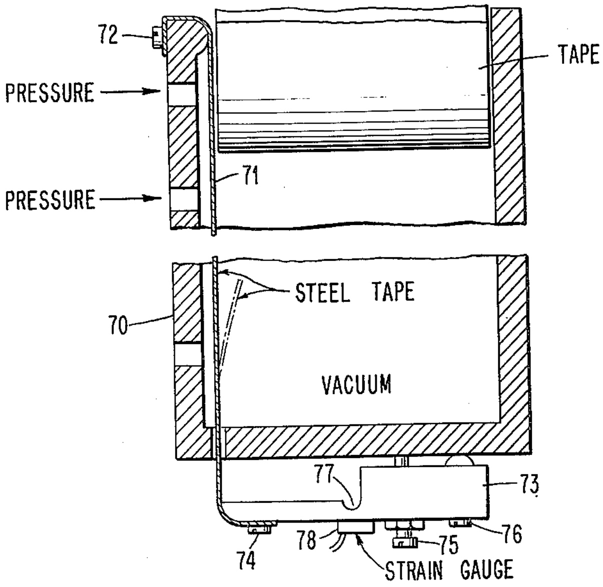
FIG. 5 is a vertical section of an alternate vacuum column device in accordance with the invention.

An alternate embodiment of the invention is shown in FIG. 5 wherein the vacuum column consists of four sides, one of which side 70 is perforated. In front of the perforated side 70 is a semi-flexible steel tape 71 which is secured at the top of the column by screw 72. The steel tape 71 extends through the bottom of the vacuum column and is secured to block 73, by screw 74. Block 73 is secured to the vacuum column through screws 75 and 76 which are separated from mounting screw 74 by a constricted portion of the block 77 over which is mounted strain gage 78.

As the tape loop moves up in the column a longer area of the steel tape 71 is exposed to the vacuum causing the tape to bow inward and pull up on screw 74, thereby causing a strain at 77 which is measured by strain gage 78. The output from the strain gage is being used as an indication of the position of the tape in the vacuum column.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a tape feeding device of the type adapted to store and control a loose length of running tape in the form of a free loop, means comprising a plurality of walls forming a storage column having an open end and a closed end, means to evacuate the chamber formed between said loop and said closed end of said column, whereby the fluid pressure created holds said loop in said column, an independent panel in one wall of said column, said panel disposed so as to subject to said fluid pressure an area proportional to the amount of tape in said column, support means for said panel, and means to measure the strain in said support means caused by the fluid pressure on said panel, said last-mentioned means including means for generating a signal the magnitude of which is proportional to said strain.

2. In a web feeding device that controls the feeding of the web by storing a running loop of said web in an evacuated chamber having a plurality of walls, said web being held in said chamber by fluid pressure, the combination of a panel in one wall of said chamber, said panel disposed so that the area of said panel exposed to said fluid pressure is proportional to the amount of tape in said chamber, support means for said panel, and measuring means to measure the strain in said support means caused by the fluid pressure acting on said panel, said measuring means including means for generating a signal proportional to said strain.

3. In a tape feeding device of the type where a running loop of tape is confined in a column, said column having an open end and a closed end, said tape entering and leaving through said open end; the combination of means for creating a vacuum in said closed end of said column, said tape being held in said column by the fluid pressure differential created by said vacuum; means disposed so as to expose to said fluid pressure differential a decreasing surface area of said means as said loop enters said column, support means for said last-mentioned means, and means for generating a signal whose magnitude is proportional to the strain in said support means which is caused by the fluid presure differential acting on said panel.

4. In a tape feeding device of the type where a running loop of tape is confined in a column, said column having an open end and a closed end, said tape entering and leaving through said open end; the combination of means for creating a vacuum in said closed end of said column, said tape being held in said column by the fluid pressure differential created by said vacuum, a stiff movable panel in said column, said panel disposed in direct contact with the edge of said tape so as to expose a decreasing area of said panel to said fluid pressure differential as said tape enters said column, support means for said panel, and means to measure the strain in said support means caused by the fluid pressure differential acting on said panel, said last-mentioned means including means for generating a signal whose magnitude is proportional to said strain.

5. In a tape handling machine of the type having a column into which the tape is pulled through the action of fluid pressure, the combination of a stiff movable panel in said column, said panel in direct contact with said tape and disposed so as to expose to said fluid pressure an area of said panel proportional to the position of said tape in said column, means supporting said panel, and means for measuring the strain in said supporting means which is caused by said fluid pressure acting on said panel.

6. A tape handling machine of the type having a column with a plurality of walls into which tape is pulled through the action of fluid pressure, characterized by an independent panel in one wall of said column, said panel disposed so as to expose to said fluid pressure an area of said panel proportional to the position of said tape in said column, means for supporting said panel, said last-mentioned means including means for manifesting in a measurable way the strain induced by the pressure on said independent panel, and means responsive to said strain for giving an electrical signal whose magnitude is proportional thereto.

7. A web feeding device of the type having a vacuum column comprising a plurality of walls characterized by an independent panel in one wall of said column, means for supporting said panel, said last-mentioned means adapted to strain in a predetermined location due to the interaction of said panel and said vacuum, and means for measuring said strain.

8. In a tape feeding device, a column for storing a running loop of tape, means for evacuating said column thereby creating a low pressure area within said column, said tape being held in said column by the pressure differential thereby created, said column comprising fixed walls and a movable wall, said movable wall disposed so as to subject a decreasing surface area of said movable wall to a pressure differential as said tape enters said column, support means supporting said movable wall by said fixed walls, and means responsive to the strain in said support means caused by the pressure differential acting on said movable walls, said means including means for generating a signal in proportion to said strain.

References Cited in the file of this patent

UNITED STATES PATENTS

| | | |
|---|---|---|
| 2,422,806 | Silverman et al. | June 24, 1947 |
| 2,831,678 | MacNeill | Apr. 22, 1958 |
| 2,921,753 | Lahti et al. | Jan. 16, 1960 |
| 2,952,415 | Gilson | Sept. 13, 1960 |